(12) United States Patent
Mazyck et al.

(10) Patent No.: US 9,849,420 B2
(45) Date of Patent: Dec. 26, 2017

(54) SYSTEMS AND METHODS FOR POST COMBUSTION MERCURY CONTROL USING SORBENT INJECTION AND WET SCRUBBING

(71) Applicant: Carbonxt, Inc., Gainesville, FL (US)

(72) Inventors: David W. Mazyck, Gainesville, FL (US); Heather Byrne, Portland, OR (US); Regina Rodriguez, Gainesville, FL (US); Christine O. Valcarce, Gainesville, FL (US)

(73) Assignee: CARBONXT, INC., Gainesville, FL (US)

( * ) Notice: Subject to any disclaimer, the term of this patent is extended or adjusted under 35 U.S.C. 154(b) by 0 days.

(21) Appl. No.: 14/810,988

(22) Filed: Jul. 28, 2015

(65) Prior Publication Data

US 2017/0312684 A1 Nov. 2, 2017

Related U.S. Application Data

(63) Continuation of application No. 14/252,428, filed on Apr. 14, 2014, now Pat. No. 9,089,816.

(60) Provisional application No. 61/812,575, filed on Apr. 16, 2013.

(51) Int. Cl.
| | |
|---|---|
| *B01D 53/14* | (2006.01) |
| *B01D 53/34* | (2006.01) |
| *B01D 53/50* | (2006.01) |
| *B01D 53/74* | (2006.01) |
| *B01D 53/75* | (2006.01) |
| *B01D 53/77* | (2006.01) |
| *B01D 53/81* | (2006.01) |

(Continued)

(52) U.S. Cl.
CPC ............ *B01D 53/64* (2013.01); *B01D 53/50* (2013.01); *B01D 53/508* (2013.01); *B01D 53/75* (2013.01); *B01D 2251/608* (2013.01); *B01D 2253/102* (2013.01); *B01D 2253/25* (2013.01); *B01D 2257/602* (2013.01); *B01D 2258/0283* (2013.01)

(58) Field of Classification Search
CPC .... B01D 53/1481; B01D 53/34; B01D 53/50; B01D 53/501; B01D 53/64; B01D 53/74; B01D 53/75; B01D 53/77; B01D 53/81; B01D 46/00
See application file for complete search history.

(56) References Cited

U.S. PATENT DOCUMENTS

| | | | | |
|---|---|---|---|---|
| 5,084,256 A | * | 1/1992 | McElroy | B01D 53/508 423/243.08 |
| 5,096,680 A | * | 3/1992 | Lindbauer | B01D 53/34 423/229 |

(Continued)

*Primary Examiner* — Timothy Vanoy
(74) *Attorney, Agent, or Firm* — Lathrop Gage LLP

(57) ABSTRACT

A system for cleaning flue gas, the system including a particulate removal system; an additive injector positioned downstream of the particulate removal system, for injecting an additive into the flue gas; a powdered sorbent injector positioned downstream of the additive injector, for injecting powdered sorbents, wherein no powdered sorbent injectors are positioned upstream of the particulate removal system; and a flue gas desulfurization system positioned downstream from the powdered sorbent injector, wherein no other processing apparatus is located between the powdered sorbent injector and the flue gas desulfurization system.

32 Claims, 3 Drawing Sheets

(51) Int. Cl.
 *B01D 46/00* (2006.01)
 *B01D 53/64* (2006.01)

(56) References Cited

U.S. PATENT DOCUMENTS

| | | | |
|---|---|---|---|
| 5,672,323 A * | 9/1997 | Bhat | B01D 53/02 422/172 |
| 6,953,494 B2 | 10/2005 | Nelson, Jr. | |
| 8,057,576 B1 | 11/2011 | Pollack | |
| 8,071,060 B2 * | 12/2011 | Ukai | B01D 53/501 422/168 |
| 8,512,655 B2 | 8/2013 | Olson et al. | |
| 8,524,179 B2 | 9/2013 | Durham et al. | |
| 8,551,431 B1 | 10/2013 | Adams | |
| 8,679,430 B2 | 3/2014 | Pollack et al. | |
| 2014/0271418 A1 * | 9/2014 | Keiser | B01D 53/64 423/210 |
| 2015/0023852 A1 * | 1/2015 | Sjostrom | B01D 53/64 423/210 |

* cited by examiner

SYSTEMS AND METHODS FOR POST COMBUSTION MERCURY CONTROL USING SORBENT INJECTION AND WET SCRUBBING

CROSS-REFERENCE TO RELATED APPLICATIONS

This application is a continuation-in-part of U.S. patent application Ser. No. 14/252,428 filed Apr. 14, 2014, which claims the benefit of U.S. Provisional Patent Application No. 61/812,575, filed Apr. 16, 2013. The entirety of these aforementioned applications is incorporated herein by reference.

TECHNICAL FIELD OF THE INVENTION

This invention relates, in general, to a system for cleaning flue gas, and, in particular, to a system and method for removing mercury with a powdered sorbent injection prior to wet scrubbing after particulate removal.

BACKGROUND OF THE INVENTION

Without limiting the scope of the present invention, its background will be described in relation to systems and methods for post combustion mercury control using sorbent injection and wet scrubbing, as an example.

With the introduction of the first national standards for mercury pollution from power plants in December of 2011, many facilities will turn to sorbent injection to meet the EPA Mercury and Air Toxics Standards (MATS) requirements. Sorbent injection is a technology that has shown good potential for achieving mercury removal to the MATS standards.

While several sorbents are viable for sorbent injection, activated carbon (AC) has been proven to the largest extent. Activated carbon is a high surface area sorbent typically created from the activation of coal (or other material high in carbon content) in a controlled environment to create a porous network. This porous network and chemical activity of the AC can be manipulated during activation/manufacturing to create an AC that will preferentially adsorb certain contaminants of concern (e.g., mercury from power plant flue gas to meets MATS standards). Additionally, post activation treatment can be performed to enhance the chemical reactivity of the AC for the target compound(s) of interest. For sorbent injection, the AC is ground and sized to produce powdered activated carbon (PAC), most typically to 95% passing the 325 mesh for mercury capture from flue gas.

Many efforts have been made to improve PAC materials to increase the mercury capture potential and thereby decrease the PAC loading to reduce materials handling and cost burdens. For example, U.S. Pat. No. 6,953,494 describes treating a carbonaceous substrate with an effective amount of a bromine-containing gas; U.S. Pat. No. 8,551,431 describes a sorbent with halogens applied with washing; U.S. Pat. No. 8,057,576 describes a dry admixture of activated carbon and halogen-containing additive; and U.S. Pat. No. 8,512,655 describes a carbon promoted by reaction with a halogen or halide and possibly other components to increase the reactivity of the sorbent. Other attempts have been made to improve the mercury removal from power plant flue gas using halogen additives to the power plant process itself. For example, U.S. Pat. No. 8,524,179 describes adding iodine or bromine to the feed material; and U.S. Pat. No. 8,679,430 describes injecting a halogen compound into the combustion chamber and/or exhaust stream.

All of these presented disclosures rely on halogen additives to improve mercury capture. Since bromine is a strong oxidant, it can also cause oxidation and corrosion of the duct system and other equipment with which it comes into contact, causing increased maintenance and cost. Further, there are currently no monitoring requirements for bromine compounds; but if emitted to the atmosphere, it would be detrimental to the environment (e.g., ozone depletion in the air and reaction to form carcinogenic compounds in water). Therefore, it would be advantageous to use alternative methods to reduce sorbent injection rates and still achieve low mercury emissions.

Sorbent injection, as applied for control of mercury for MATS compliance, typically involves the pneumatic conveyance of a powdered sorbent from a storage silo into the process gas of a power plant's flue duct downstream of the boiler and upstream of a particulate control device such as an electrostatic precipitator (ESP) or fabric filter (FF). Once introduced to the process gas, the powdered sorbent disperses and adsorbs mercury and other unwanted constituents in the flue gas. The powdered sorbent with adsorbed mercury (and other constituents) then is captured and removed from the gas by a particulate control device.

In coal-fired power plants, mercury capture sorbents typically will be co-collected with other particle matter such as fly ash in an electrostatic precipitator, fabric filter, an electrostatic precipitator in series with a fabric filter, two electrostatic precipitators in series, two fabric filters in series, or similar devices. At this typical injection location (upstream of a particulate collection device), the sorbents' capacity for mercury is limited by the temperatures naturally present (e.g., greater than 350° F.) as the injected sorbents physically and chemically adsorb mercury through endothermic processes. In such a configuration, the time between the injection point and collection point typically is less than three seconds. Therefore, the adsorption of mercury is limited by diffusion and reaction kinetics possible in this short time. Alternatively, if a fabric filter is used as the particulate control device, longer residence times can be realized. This technique is not preferred due to the high cost to install and operate fabric filters as the primary particulate control device.

A drawback to co-collection of sorbents with fly ash has arisen in some scenarios when fly ash is sold as a commodity product. Comingling the sorbent and fly ash makes the mixture of a quality no longer acceptable to sell. To alleviate this issue, two particulate control devices may be employed in series with the second being a fabric filter and sorbent injection for mercury control between the two. This technique segregates the sorbent from fly ash collection and allows for longer contact times for the sorbent to collect mercury. While effective, the capital expenditure, additional operational costs, and pressure drop of the additional fabric filter unit are exorbitant and increase the cost of control. Similarly, sorbent might be injected into the later sections of an electrostatic precipitator so as to try to segregate fly ash material and sorbent. This method, however, even further limits residence time for the carbon to remove mercury, as compared to traditional injection upstream of the electrostatic precipitator, so often would not improve mercury removal or injection rates necessary to substantially reduce mercury emissions.

After exiting the particulate control device, the process gas continues through flue gas ducts with decreased levels of mercury and other constituents. At this point, it is either emitted out of the stack or perhaps passes through a wet flue gas desulfurization (WFGD) unit when installed. Wet flue gas desulfurization units are currently installed on over 50% of the MW capacity in the United States to reduce sulfur dioxide ($SO_2$) emissions. While intended for $SO_2$ capture, mercury also can be captured in the wet flue gas desulfurization units. A high percentage of mercury in the flue gas will partition to a wet flue gas desulfurization liquid when it is found in the oxidized form, but the elemental mercury will pass through without capture. Once oxidized mercury is captured in the liquid, however, it can be reduced by chemical reactions to elemental mercury and leave the stack, referred to as "mercury re-emission." Sorbent introduced in the wet flue gas desulfurization liquid could sequester mercury species already present in the liquid stream and minimize re-emission of mercury from wet flue gas desulfurization units. While this is positive, a significant portion of the mercury (the uncaptured oxidized and elemental mercury fractions) in the original flue gas could "bypass" the wet flue gas desulfurization unit and still contribute to stack emissions.

The above-described injection locations in coal-fired power applications can have some disadvantages. First, as the powdered sorbent mixes with the fly ash, it changes the properties of the mixture that can affect the salability of this byproduct. For example, fly ash often is sold for use as a cement additive. During concrete production, an air-entrained admixture (AEA) is also added to develop strength properties. When powdered sorbents are mixed with fly ash, especially PAC, they can adsorb the AEA, diminishing its effectiveness and requiring more AEA to be added. Increases in AEA add to cost and thereby may prohibit the sale of fly ash for a cement additive. For facilities that sell fly ash, a solution other than a typical PAC injection must be applied to preserve these byproduct sales.

Second, for most facilities, sorbent injection is a retrofit technology applied to the existing infrastructure. Injection locations have to be installed within existing duct networks that may have poor mixing or residence time necessary for high mercury removal.

In summary, sorbent injection is a proven effective way to remove mercury; however, for some applications, the amount of PAC required can be very high and, therefore, costly (e.g., because of the high temperatures, short residence times, and numerous other complicating factors).

SUMMARY OF THE INVENTION

The present invention disclosed herein is directed to systems and methods for post combustion mercury control using sorbent injection and wet scrubbing.

In one embodiment, the present invention is directed to a system for cleaning flue gas, the system including a particulate removal system; an additive injector positioned downstream of the particulate removal system, for injecting an additive into the flue gas; a powdered sorbent injector positioned downstream of the additive injector, for injecting powdered sorbents, wherein no powdered sorbent injectors are positioned upstream of the particulate removal system; and a flue gas desulfurization system positioned downstream from the powdered sorbent injector, wherein no other processing apparatus is located between the powdered sorbent injector and the flue gas desulfurization system.

In one aspect, the particulate removal system may be a fabric filter. In another aspect, the particulate removal system may be an electrostatic precipitator. Further, no other substance is injected between the powdered activated carbon injector and the flue gas desulfurization system. Additionally, the flue gas desulfurization system may be a wet flue gas desulfurization system.

In yet another aspect, the system may include an air heater located upstream from the particulate removal system. Also, the system may include a selective catalytic reduction system located upstream of the air heater. In still yet another aspect, the system may include a hydrocyclone in communication with the flue gas desulfurization system, the hydrocyclone used for removing the activated carbon from dewatered slurry resulting from the flue gas desulfurization system. Additionally, the powdered sorbent may be powdered activated carbon.

In still yet another aspect, the powdered activated carbon may improve mercury removal without halogens. Further, the additive injector injects one or more of the group consisting of organosulfides, inorganic sulfides, acids, bases, metal oxides, oxides, metals, photocatalysts, and minerals into the flue gas. Also, the powdered sorbents reduce mercury concentrations in the air phase. Additionally, the powdered sorbents reduce mercury concentrations in the air phase and water phase of the wet flue gas desulfurization system such that the discharge water of the wet flue gas desulfurization system has a lower mercury concentration than prior to the injection of the powdered sorbents into the flue gas upstream of the wet flue gas desulfurization system.

In another aspect, the powdered sorbents may reduce concentrations of one or more of the group consisting of nitrates and nitrites, heavy metals, mercury, arsenic, lead, and selenium in the wet flue gas desulfurization system such that the discharge water of the wet flue gas desulfurization has lower concentrations than prior to the injection of the powdered sorbents into the flue gas upstream of the wet flue gas desulfurization system. Also, the powdered sorbents may reduce mercury concentration in the air phase and reduce concentrations of one or more of group consisting of nitrates, nitrites, heavy metals, mercury, arsenic, lead, and selenium in the wet flue gas desulfurization system. Additionally, the powdered sorbents are without halogens and impregnated or admixed with one or more of the group consisting of organosulfides, inorganic sulfides, acids, bases, metal oxides, oxides, metals, photocatalysts, and minerals.

In another embodiment, the present invention is directed to a method of cleaning flue gas, the method including removing particulates from flue gas using a particulate removal system; injecting an additive into the flue gas downstream of the particulate removal system; injecting powdered sorbent into the flue gas downstream of the injecting an additive, wherein no powdered sorbent is injected upstream of the particulate removal system; and treating the flue gas in a flue gas desulfurization system positioned downstream from a point where the powdered sorbent is injected, wherein no other processing is done between the powdered sorbent injector and the flue gas desulfurization system.

In one aspect, the particulate removal system may include an electrostatic precipitator. In another aspect, no other substance is injected between the point where the powdered sorbent is injected and the flue gas desulfurization system. In yet another aspect, the flue gas desulfurization system may be a wet flue gas desulfurization system. Also, an air heater may be located upstream from the particulate removal system. Additionally, a selective catalytic reduction system is located upstream of the air heater.

In yet another aspect, the method may include removing the powdered sorbent from dewatered slurry in the flue gas desulfurization system using a hydrocyclone in communication with the flue gas desulfurization system. Also, the powdered sorbent may be powdered activated carbon. Further, the powdered activated carbon improves mercury removal without halogens. In still yet another aspect, the powdered activated carbon improves mercury removal without halogens. Additionally, the injecting an additive may include injecting into the flue gas one or more of the group consisting of organosulfides, inorganic sulfides, acids, bases, metal oxides, oxides, metals, photocatalysts, and minerals.

In another aspect, the method may include reducing mercury concentration in the air phase of the wet flue gas desulfurization system with the powdered sorbent. Also, the method may include reducing mercury concentrations in the air phase and water phase of the wet flue gas desulfurization system such that the discharge water of the wet flue gas desulfurization system has a lower mercury concentration than prior to the injection of the powdered sorbents into the flue gas upstream of the wet flue gas desulfurization system with the powdered sorbent.

Further, the method may include reducing concentrations of one or more of the group consisting of nitrates and nitrites, heavy metals, mercury, arsenic, lead, and selenium in the wet flue gas desulfurization system such that the discharge water of the wet flue gas desulfurization as lower concentrations than prior to the injection of the powdered sorbents into the flue gas upstream of the wet flue gas desulfurization system with the powdered sorbent. Additionally, the method may include reducing mercury concentration in the air phase and reduce concentrations of one or more of group consisting of nitrates, nitrites, heavy metals, mercury, arsenic, lead, and selenium in the wet flue gas desulfurization system with the powdered sorbent. Preferably, the powdered sorbent is without halogens and impregnated or admixed with one or more of the group consisting of organosulfides, inorganic sulfides, acids, bases, metal oxides, oxides, metals, photocatalysts, and minerals.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
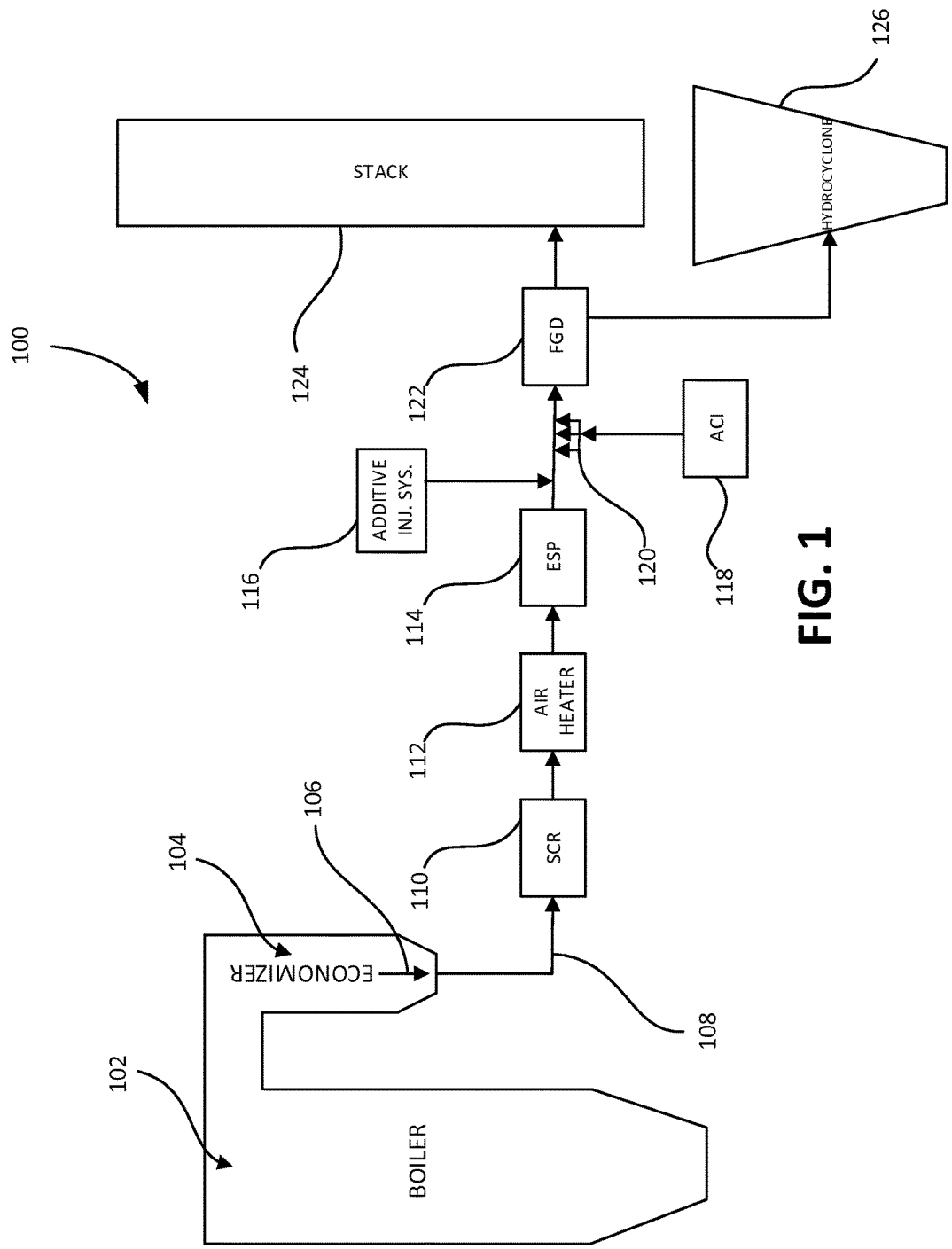
FIG. 1 is an illustration of a post combustion mercury control using sorbent (in many cases, activated carbon injection (ACI) system) and wet scrubbing according to an embodiment.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not limit the scope of the present invention.

Described herein are embodiments for post combustion mercury control using sorbent (in many cases, activated carbon injection (ACI) system) and wet scrubbing (hereinafter "Improved Sorbent Injection System") and methods of using it and making it. In some embodiments, the Improved Sorbent Injection System includes injecting the sorbent at an improved point in the post-combustion cleaning system of a coal-fired power plant (or, in alternatives, other types of power plants and exhaust systems). In some embodiments, the Improved Sorbent Injection System includes injecting the sorbent at a point in the system where it later can be filtered out without affecting other cleaning processes. In many embodiments, the sorbent injected is activated carbon; however, in alternatives, other sorbents may be used. When the term "sorbent" is used herein, in many embodiments this may be activated carbon, although other sorbents may be used.

The Improved Sorbent Injection System additionally includes the revelation that the available electrostatic precipitators may be on the hot side of an air-heater, which is a more challenging environment for sorbents to remove mercury because of the elevated temperatures and short residence times. Therefore, the Improved Sorbent Injection System includes the use of alternative injection strategies with longer residence times, better mixing, and lower temperatures that are more advantageous.

For facilities burning bituminous coal with substantial levels of sulfur, sulfur trioxide ($SO_3$) will be generated and be present in the flue gas stream. $SO_3$ also can be found in substantial quantities when power plants inject it to condition fly ash aiding in its removal. In implementing embodiments of the Improved Sorbent Injection System, it has been noted that PAC and most sorbents traditionally lose their capacity for mercury removal with increasing concentrations of $SO_3$. In implementing embodiments of the Improved Sorbent Injection System, it has been investigated and determined that $SO_3$ concentration will be highest right after the boiler and will decrease through the duct system as it sorbs and reacts with fly ash. Additionally, once the temperature cools sufficiently, it will condense to sulfuric acid mist, which does not adversely affect PAC. In implementing embodiments of the Improved Sorbent Injection System, it has been discovered that with typical PAC injection locations before the electrostatic precipitator/fabric filter, $SO_3$ concentrations are close to the maximum and will cause the largest detrimental effect on mercury removal. Previous mitigation methods are to add a dry sorbent to reduce $SO_3$ concentrations to improve PAC performance. However, this adds more capital and operating costs. Therefore, embodiments of the Improved Sorbent Injection System have been designed to circumvent adverse impacts of $SO_3$.

In embodiments of the Improved Sorbent Injection System, alternative injection strategies are utilized. A standard power plant setup typically includes a boiler, followed by an air heater, and followed by a particulate control device (electrostatic precipitator or fabric filter) that exits in an exhaust stack. As air pollution regulations have become more stringent, additional pollution control devices have been added to the standard power plant configuration. Therefore, selective catalytic reduction (SCR) units could be added between the boiler and the air heater for controlling nitrogen oxides ($NO_x$s). For $SO_2$ control, flue gas desulfurization units (FGD) could be installed between the electrostatic precipitator and exhaust stack.

Embodiments of Improved Sorbent Injection System provide that PAC will no longer accumulate with the fly ash, since the overwhelming majority of fly ash will occur in the traditional particulate capture equipment (i.e., electrostatic precipitator, fabric filter). Therefore, this fly ash byproduct can be used and sold for various purposes, such as for use in concrete. Since the injection point typically is further downstream, effluent will be cooler. The longer residence time and cooler temperature will lead to improved removal of mercury. After the electrostatic precipitator or other particulate control device, gases that might compete with the activity of the PAC in the removal of the mercury will be lessened. Furthermore, the re-emission of mercury likely is reduced, since more of the mercury will be captured in the PAC and is not available for the reaction in the slurry. Since the mercury will not be as available in the slurry, when the slurry is dewatered, the residual mercury and other reaction byproducts in the dewatered slurry will be lessened. By removing the PAC, the wet flue gas desulfurization solids byproduct integrity can be maintained for reuse, recycling, or disposal.

Embodiments of the Improved Sorbent Injection System were not known or expected, since the wet flue gas desulfurization system is used for control of $SO_2$ gases; and using it for particulate removal of powdered sorbents is an unexpected application. The wet flue gas desulfurization unit is quite suited for the removal of powders, even though this is not a typical application. Mercury removal will occur in the gas phase, and then be retained during contact in the wet flue gas desulfurization unit. Those in the art focus on capturing mercury from the liquid phase of a wet flue gas desulfurization unit. In contrast, the position of the injection of powdered sorbent provides gas phase capture of mercury. $SO_3$ will be lower downstream of the particulate control devices, thereby reducing the exposure of the sorbent to this detrimental acidic compound and thereby eliminate the need to apply dry sorbent injection to eliminate $SO_3$ before it comes into contact with the sorbent. Also, since the temperature of the flue gas will be cooler at the point of injection, the activity of $SO_3$ is reduced. Also for wet flue gas desulfurization units, the powdered sorbent materials contribute to the reduction of other unwanted reactions and constituents in the discharged liquid (such as heavy metals and nutrients) after contact with the slurry. In this way, there is the advantage of serving as two treatment processes (one for mercury removal and the other for wastewater treatment) encompassed by one material and system.

In one embodiment, specifically engineered PACs for mercury removal are applied with sorbent injection for mercury removal from coal-fired power plant flue gas. In concert with the engineered PACs, complimentary improvements to the overall system are provided.

Furthermore, if PAC is utilized as the sorbent, it can be engineered also to improve wet flue gas desulfurization slurry chemistry and improve the quality of the discharged wastewater. In fact, some systems may teach that merely the injection of PAC prior to the flue gas desulfurization is sub-optimal and call for the injection of additional materials and other treatments. However, by the proper positioning of the injection site of the PAC, at proper temperatures and after the removal of much particulate, with the proper PAC selection an advantageous system is achieved.

Referring initially to FIG. 1, an embodiment of an Improved Sorbent Injection System ("system") is schematically illustrated and generally designated 100. System 100 may be a coal-fired electric power generation plant, in one embodiment. System 100 may include a boiler 102, such as for a coal-fired power plant. Although the example described herein applies to coal-fired power plants, the process gas or flue gas to be treated may originate from many industrial facilities such as a power plant, cement plant, waste incinerator, or other facilities that will occur to one skilled in the art.

Such gas streams contain many contaminants and/or pollutants, such as mercury, that are desirable to control and/or decrease in concentration for protection of health and the environment. Nevertheless, system 100 is being described for removing, controlling, and/or reducing pollutants, such as mercury, from a coal-fired power plant gas stream using one or more of activated carbon injection devices/units and additive injection devices/units as discussed herein. Boiler 102 may be a coal-fired boiler that burns or combusts coal to heat water into superheated steam for driving steam turbines that produce electricity. These types of power plants are common throughout the U.S. and elsewhere. Boiler 102 may further include an economizer 104, in one embodiment. Economizer 104 may be used to recover heat produced from boiler 102.

The flue gas or process gas 106 exiting boiler 102 and/or economizer 104 may then be flowed, transported, ducted, piped, etc. via one or more process lines 108 to a selective catalytic reduction unit 110 for the removal of nitrogen containing compounds, in one embodiment. Typically, selective catalytic reduction unit 110 may convert $NO_x$ compounds to diatomic nitrogen ($N_2$) and water ($H_2O$) using a catalyst and a gaseous reductant, such as an ammonia containing compound.

Process gas 106 may then be flowed, transported, ducted, piped, etc. to a heat exchanger, pre-heater, and/or air heater 112 where heat is transferred from process gas 106 to a feed of air to be fed back into boiler 102. Process gas 106 may then be transferred via process line 108 to an electrostatic precipitator 114 for removal of particulates contained in process gas 106, in one example.

System 100 may also include an additive injection device/unit 116 for injecting one or more compounds, chemicals, etc., such as organosulfides, inorganic sulfides, acids, bases, metal oxides, oxides, metals, photocatalysts, and/or minerals to aid with sorbent performance. Preferably, additive injection unit 116 is located downstream of electrostatic precipitator 114 for injecting these compounds and/or chemicals prior to injection of activated carbon products as discussed herein. System 100 may further include one or more activated carbon injection ("ACI") devices, units, systems, etc. (ACI unit 118). ACI unit 118 may include an activated storage vessel, such as a powdered activated carbon (PAC) storage vessel. Such vessels may be silos, and the like where activated carbon, such as PAC, may be stored for use in system 100. Activated carbon silo (not shown) may be any type of storage vessel such that it is capable of containing a supply and/or feedstock of activated carbon, such as PAC, for supplying the activated carbon to process gas 106 of system 100. Some additional exemplary activated carbon silos may include supersacs, silos, storage vessels, and the like.

Activated carbon may be injected anywhere along process line 108 downstream of additive injection unit 116, preferably. In one embodiment, system 100 may include one or more fluidizing nozzles 120 that may assist in providing activated carbon in a fluidized form, such that it may be transported in a substantially fluid form downstream in system 100. Additionally, system 100 may include one or more control valves (not shown) that may be disposed and/or located substantially proximal to the exit or outlet of activated carbon and/or fluidizing nozzles 120 for controlling the flow of activated carbon from ACI unit 118 to system 100. The feed of activated carbon can also be controlled by a series of additional control valves, movable barriers, etc. (not shown). To assist the process of fluidizing activated carbon for exiting ACI unit 118, fluidization assistance may be applied in the form of physical agitation or the use of fluidizing nozzles. In addition, system 100 may include other types of control valves, such as manual valves (not shown), and the like as would be known to those skilled in the art.

The treated process gas 106 may then be sent to a flue gas desulfurization unit 122 via process line 108 for removal of sulfur compounds, in one embodiment. After being treated in flue gas desulfurization unit 122, treated process gas 106 may then be sent to a stack 124 for emission into the environment. As is known to those skilled in the art, flue gas desulfurization unit 122 may have an gas/air phase and a liquid/water phase; system 100 described herein reduces mercury concentrations in the air phase and liquid phase of flue gas desulfurization unit 122, such that the discharge water of flue gas desulfurization unit 122 has a lower concentration of mercury in the process or flue gas than prior to upstream of ACI unit 118.

Additionally, activated carbon is used to target reduced concentrations of nitrates/nitrites and heavy metals, such as mercury, arsenic, lead, and selenium in the liquid or wet phase of flue gas desulfurization unit 122 such that the discharge water of flue gas desulfurization unit 122 has lower concentrations of these contaminants in the process or flue gas than prior to upstream of ACI unit 118.

In one embodiment, activated carbon of system 100 is used to target reduced concentrations of mercury in the gas/air phase and reduced concentrations of nitrates/nitrites and heavy metals such as mercury, arsenic, lead, and selenium in the wet phase of flue gas desulfurization unit 122. System 100 may also include a hydrocyclone 126 for further removal of particulates in the wet flue gas desulfurization unit liquor prior to discharges. Hydrocyclone 126 removes activated carbon, powdered sorbent, powdered activated carbon, and the like from the wastewater of the wet flue gas desulfurization unit 122.

Example 1—Preparation of PAC

A magnetic activated carbon sample with 6% by weight of magnetite ($Fe_3O_4$) was prepared with PAC treated with a wet method to precipitate ferric chloride and ferrous sulfate in 200 lb. batches followed by dewatering and drying at 200° C. The dried product was sieved and resulted in about 95% of the final product passing through a 325-mesh sieve.

Mercury Removal

Figure 2:
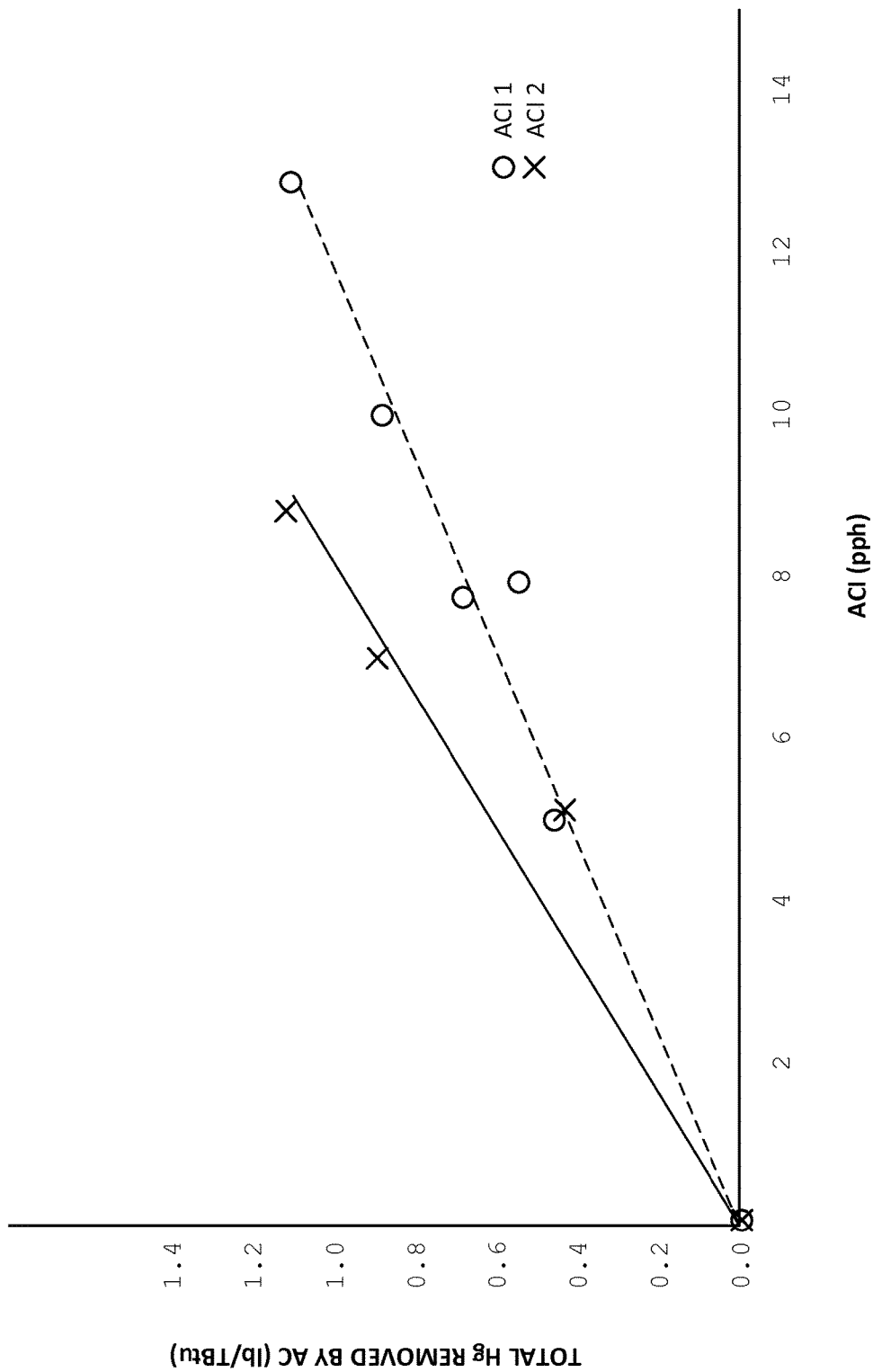
FIG. 2 is a chart showing improved mercury capture when using an Improved Sorbent Injection System according to an embodiment.

The product was tested at the Mercury Research Center (MRC). The MRC removes a constant flow of approximately 20,500 actual cubic feet per minute (acfm) of flue gas (representative of a 5 mega watt [MW] boiler) from the Southern Company Plant Christ Boiler (78 MW). The boiler runs on a low-sulfur bituminous coal blend from varying sources. The typical $SO_3$ concentration of the fuel blends resulted in about 2 parts per million (ppm) of $SO_3$. FIG. 2 shows improved mercury capture when using an embodiment of an Improved Sorbent Injection System. The product was pneumatically injected at increasing injection rates upstream of the electrostatic precipitator (ACI 1 in FIG. 2) and downstream of the electrostatic precipitator (ACI 2 in FIG. 2). Particulate removal was achieved with the electrostatic precipitator for ACI 1. Particulates remained uncaptured for ACI 2, and returned to the Christ process train. Mercury concentrations were monitored at the MRC inlet and the MRC outlet, and the observed concentrations were converted to pounds per trillion British thermal units (lb/Tbtu) using the standard EPA Method 19. Mercury removal by the AC was calculated as the inlet mercury concentration minus the outlet mercury concentration and is illustrated in FIG. 2. At typical injection rates and above, less AC is necessary to remove the same amount of AC which would result in significant cost savings for the utility.

Figure 3:
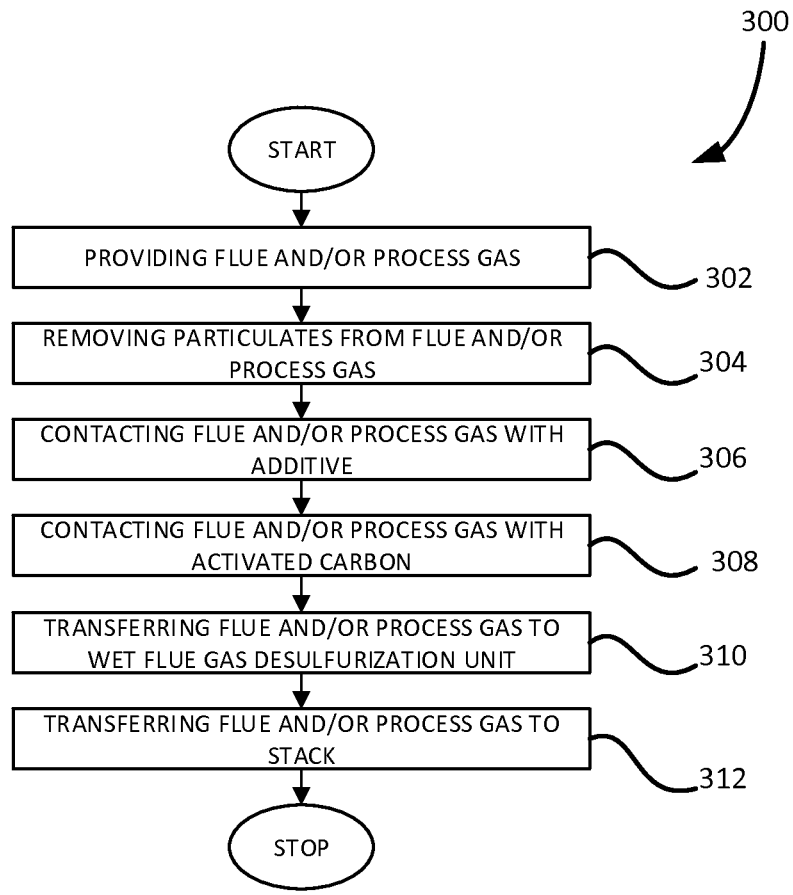
FIG. 3 is a flowchart of a process for controlling mercury from process gas according to an embodiment.

Turning now to FIG. 3, a method for controlling mercury removal in flue gas or process gas is schematically illustrated and generally designated 300. In step 302, process or flue gas may be transferred to a pre-heater for heat transfer to an air source to be fed back into a particular unit, such as boiler 102. This step may also include transferring the process or flue gas to an economizer prior to transferring it to a SCR, such as selective catalytic reduction unit 110.

In step 304, the process or flue gas may be transferred to a particulate collection device/unit, such as electrostatic precipitator 114. This step may include removing particulates from the process or flue gas. In step 306, a chemical and/or compound may be injected into process or flue gas downstream of the particulate collection device/unit, such as electrostatic precipitator 114. This step may include contacting the process and flue gas with one or more of organosulfides, inorganic sulfides, acids, bases, metal oxides, oxides, metals, photocatalysts, and/or minerals to aid with activated carbon/sorbent performance.

In step 308, the process or flue gas may be contacted with activated carbon, such as from ACI unit 118. In this step, activated carbon may be PAC. Preferably, such contact occurs downstream of the injection described in step 306. Such contacting of the process or flue gas with activated carbon after the injection described in step 306 reduces the mercury concentration of the process or flue gas. In step 310, the process or flue gas is transferred to a wet flue gas desulfurization unit, such as flue gas desulfurization unit 122, where the powdered sorbent material contributes to the reduction of other unwanted reactions and constituents in the discharged liquid (such as heavy metals and nutrients) after contact with the slurry in flue gas desulfurization unit 122. In this way, there is the advantage of serving as two treatment processes (one for mercury removal and the other for wastewater treatment) encompassed by one material and system.

Additionally in this step, activated carbon is used to target reduced concentrations of nitrates/nitrites and heavy metals, such as mercury, arsenic, lead, and selenium in the liquid or wet phase of flue gas desulfurization unit 122 such that the discharge water of flue gas desulfurization unit 122 has lower concentrations of these contaminants in the process or flue gas than prior to upstream of ACI unit 118. In step 312, the process or flue gas may be transferred to a stack for emitting to the environment.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A system for cleaning flue gas, the system comprising:
   a particulate removal system;
   an additive injector positioned downstream of the particulate removal system, for injecting an additive into the flue gas;
   a powdered sorbent injector positioned downstream of the additive injector, for injecting powdered sorbents, wherein no powdered sorbent injectors are positioned upstream of the particulate removal system; and
   a flue gas desulfurization system positioned downstream from the powdered sorbent injector, wherein no other processing apparatus is located between the powdered sorbent injector and the flue gas desulfurization system.

2. The system of claim 1, wherein the particulate removal system is a fabric filter.

3. The system of claim 1, wherein the particulate removal system is an electrostatic precipitator.

4. The system of claim 1, wherein no other substance is injected between the powdered activated carbon injector and the flue gas desulfurization system.

5. The system of claim 1, wherein the flue gas desulfurization system is a wet flue gas desulfurization system.

6. The system of claim 1, further comprising:
   an air heater located upstream from the particulate removal system.

7. The system of claim 6, further comprising:
   a selective catalytic reduction system located upstream of the air heater.

8. The system of claim 1, further comprising:
   a hydrocyclone in communication with the flue gas desulfurization system, the hydrocyclone used for removing the activated carbon from dewatered slurry resulting from the flue gas desulfurization system.

9. The system of claim 1, wherein the powdered sorbent is powdered activated carbon.

10. The system of claim 9, wherein the powdered activated carbon improves mercury removal without halogens.

11. The system of claim 1, wherein the additive injector injects one or more of the group consisting of organosulfides, inorganic sulfides, acids, bases, metal oxides, oxides, metals, photocatalysts, and minerals into the flue gas.

12. The system of claim 1, wherein the powdered sorbents reduce mercury concentrations in the air phase.

13. The system of claim 5, wherein the powdered sorbents reduce mercury concentrations in the air phase and water phase of the wet flue gas desulfurization system such that the discharge water of the wet flue gas desulfurization system has a lower mercury concentration than prior to the injection of the powdered sorbents into the flue gas upstream of the wet flue gas desulfurization system.

14. The system of claim 5, wherein the powdered sorbents reduce concentrations of one or more of the group consisting of nitrates and nitrites, heavy metals, mercury, arsenic, lead, and selenium in the wet flue gas desulfurization system such that the discharge water of the wet flue gas desulfurization has lower concentrations than prior to the injection of the powdered sorbents into the flue gas upstream of the wet flue gas desulfurization system.

15. The system of claim 5, wherein the powdered sorbents reduce mercury concentration in the air phase and reduce concentrations of one or more of group consisting of nitrates, nitrites, heavy metals, mercury, arsenic, lead, and selenium in the wet flue gas desulfurization system.

16. The system of claim 1, wherein the powdered sorbents are without halogens and impregnated or admixed with one or more of the group consisting of organosulfides, inorganic sulfides, acids, bases, metal oxides, oxides, metals, photocatalysts, and minerals.

17. A method of cleaning flue gas, the method comprising:
   removing particulates from flue gas using a particulate removal system;
   injecting an additive into the flue gas downstream of the particulate removal system;
   injecting powdered sorbent into the flue gas downstream of the injecting an additive, wherein no powdered sorbent is injected upstream of the particulate removal system; and
   treating the flue gas in a flue gas desulfurization system positioned downstream from a point where the powdered sorbent is injected, wherein no other processing is done between the powdered sorbent injector and the flue gas desulfurization system.

18. The method of claim 17, wherein the particulate removal system includes an electrostatic precipitator.

19. The method of claim 17, wherein no other substance is injected between the point where the powdered sorbent is injected and the flue gas desulfurization system.

20. The method of claim 17, wherein the flue gas desulfurization system is a wet flue gas desulfurization system.

21. The method of claim 17, wherein an air heater is located upstream from the particulate removal system.

22. The method of claim 21, wherein a selective catalytic reduction system is located upstream of the air heater.

23. The method of claim 17, further comprising:
   removing the powdered sorbent from dewatered slurry in the flue gas desulfurization system using a hydrocyclone in communication with the flue gas desulfurization system.

24. The method of claim 17, wherein the powdered sorbent is powdered activated carbon.

25. The method of claim 24, wherein the powdered activated carbon improves mercury removal without halogens.

26. The method of claim 24, wherein the powdered activated carbon improves mercury removal without halogens.

27. The method of claim 17, wherein injecting an additive comprises:
   injecting into the flue gas one or more of the group consisting of organosulfides, inorganic sulfides, acids, bases, metal oxides, oxides, metals, photocatalysts, and minerals.

28. The method of claim 20, further comprising:
   reducing mercury concentration in the air phase of the wet flue gas desulfurization system with the powdered sorbent.

29. The method of claim 20, further comprising:
   reducing mercury concentrations in the air phase and water phase of the wet flue gas desulfurization system such that the discharge water of the wet flue gas desulfurization system has a lower mercury concentration than prior to the injection of the powdered sorbents into the flue gas upstream of the wet flue gas desulfurization system with the powdered sorbent.

30. The method of claim 20, further comprising:
   reducing concentrations of one or more of the group consisting of nitrates and nitrites, heavy metals, mercury, arsenic, lead, and selenium in the wet flue gas desulfurization system such that the discharge water of the wet flue gas desulfurization as lower concentrations than prior to the injection of the powdered sorbents into the flue gas upstream of the wet flue gas desulfurization system with the powdered sorbent.

31. The method of claim 20, further comprising:
reducing mercury concentration in the air phase and reduce concentrations of one or more of group consisting of nitrates, nitrites, heavy metals, mercury, arsenic, lead, and selenium in the wet flue gas desulfurization system with the powdered sorbent.

32. The method of claim 17, wherein the powdered sorbent is without halogens and impregnated or admixed with one or more of the group consisting of organosulfides, inorganic sulfides, acids, bases, metal oxides, oxides, metals, photocatalysts, and minerals.

\* \* \* \* \*